United States Patent Office 3,397,157
Patented Aug. 13, 1968

3,397,157
RAPID CURING EPOXY RESIN COMPOSITIONS
George W. Holmes, Walnut Creek, Calif., assignor to The Dow Chemical Company, Midland, Mich., a corporation of Delaware
No Drawing. Filed Nov. 26, 1965, Ser. No. 510,096
8 Claims. (Cl. 260—2)

ABSTRACT OF THE DISCLOSURE

This invention relates to compositions of matter consisting essentially of the reaction products of certain epoxy resins, a dicyandiamide curing agent and an accelerator comprising certain polyamine-metallic salt coordination complexes. These compositions are particularly suitable for use as adhesives and coatings and the like where a rapid high temperature latent cure is desired.

Dicyandiamide has been used as a latent curing agent for epoxy resins. There is substantially no reaction between the curing agent and resin over long periods of time at ambient temperatures. The mixture must be heated to a temperature of about 165° C. and held at that temperature for an extended period of time to effect the cure. The rate of cure increases with temperatures up to about 200°–220° C. where the cure is almost instantaneous. The rate of cure can be accelerated or otherwise modified with amines, amides, quaternary ammonium compounds, and certain substituted melamines.

We have found that the cure of epoxy resins with dicyandiamide can be significantly accelerated with certain polyamine-metallic salt coordination complexes. Thus, our invention enables the curing of epoxy resins with dicyandiamide as a latent curing agent with the ability to decrease the temperature at which the latent curing agent produces a cure without adversely affecting the properties of the cured resin.

It is known that various metal salts such as zinc and cadmium halides, form complexes with polyamines, such as ethylenediamine and diethylenetriamine. Such compounds, which are hereinafter referred to as coordination complexes, are also known to be unstable under the influence of heat.

The coordination complexes contemplated for use by the present invention are the metallic salts of a polyamine having the general formula $$H_2N{-}(CH_2{-}CH_2{-}NH)_nR$$

where $n$ is an integer of from 1 to 5 and R is hydrogen, alkyl, aryl and aralkyl, which complexes decompose rapidly when subjected to temperatures within the range of from about 100°–200° C. As exemplary of suitable metal salts are zinc and cadmium halides, oxalates or benzoates and the like. Suitable polyamines includes the polyethylene amines such as ethylenediamine, substituted ethylenediamines such as N - (β - phenethyl)ethylenediamine, and diethylenetriamine. Other suitable polyamines include dipropylenediamine and piperidine and the like and their substituted derivatives. It is to be understood, however, that the above compounds are merely illustrative and that other salts or other polyamines may be used provided that the salt and polyamines are capable of forming a coordination complex which will decompose at a temperature within the range of from about 100° C. to 200° C.

Dicyandiamide has been useful as a latent curing agent for all of the common epoxy resins. The polyamine-metallic salt coordination complexes, as herein defined, may be used according to this invention to accelerate the cure of any of these dicyandiamide-epoxy resin systems. Among the epoxy resins which may be cured with this combination of agents are the polyglycidyl derivatives of (1) dihydric phenols; (2) alkyl substituted dihydric phenols; (3) halogen substituted dihydric phenols; (4) bisphenols represented by the formula

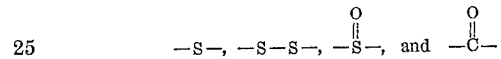

where R is selected from the group consisting of alkylene,

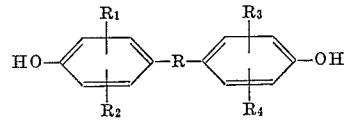

(5) polyoxyalkylene glycols; (6) the condensation products of formaldehyde and phenol, alkyl substituted phenols of halogen substituted phenols; and (7) aromatic amines; and $R_1$, $R_2$, $R_3$, and $R_4$ are independently selected from the group consisting of hydrogen and halogen.

Methods by which the resins can be prepared are illustrated in the following examples.

Example 1

In each of a series of experiments, 100 parts by weight of an epoxy resin comprising a polyglycidyl ether of an o-cresol-formaldehyde resin having an epoxide equivalent weight of about 225 and a Durran's melting point of about 73° C. was admixed with varying amounts of pulverized dicyandiamide and an N-(β-phenethyl)ethylenediamine-zinc oxalate complex containing 68 percent diamine (determined by nitrogen analysis), corresponding to a 1:2 complex of zinc salt and diamine. The resin mixtures were cured individually at a temperature of 165° C. and the times required to cure to a gel state, as determined by the conventional stroke cure test, were recorded.

The following Table I illustrates the amounts of dicyandiamide and coordination complex employed as parts per hundred parts of epoxy resin (phr.) and the stroke cure time, in seconds, required.

TABLE I

| Sample Number | (phr.) Dicyandiamide | (phr.) Coord. Complex | Stroke Cure Time, Sec. @ 165° |
|---|---|---|---|
| For Comparison: | | | |
| 1 | 20 | 0 | 790 |
| 2 | 0 | 20 | 70 |
| The Invention: | | | |
| 3 | 10 | 10 | 33 |

Example 2

A series of additional experiments were conducted essentially as described in Example 1 wherein a coordination complex prepared from zinc oxalate and ethylenediamine containing 37.4 percent ethylenediamine, corresponding to a 2:3 complex of zinc salt and diamine, was substituted for the zinc oxalate-N-(β-phenethyl)-ethylenediamine complex. Table II illustrates the formulations used and the results obtained.

TABLE II

| Sample Number | (phr.) Dicyandiamide | (phr.) Coord. Complex | Stroke Cure Time, Sec. @ 165° |
|---|---|---|---|
| For Comparison: | | | |
| 4 | 10 | 0 | 900 |
| 5 | 0 | 10 | 65 |
| The Invention: | | | |
| 6 | 1 | 9 | 28 |
| 7 | 2 | 8 | 32 |
| 8 | 3 | 7 | 32 |
| 9 | 4 | 6 | 47 |

Example 3

In each series of experiments, varying amounts of a coordination complex prepared from zinc chloride and ethylenediamine containing 51.5 percent diamine, corresponding to a 1:3 complex of zinc salt and diamine, were added to the epoxy resin of Example 1. Each of the formulations were then separately spread on two individual strips of 1" x 4" x 0.064" aluminum strips, which strips were then joined by forming a one inch by one-half inch overlap joint. Each of the individual samples was then loosely clamped together and placed in a circulating air oven for a period of 15 minutes with such oven being maintained at a temperature of about 175° C. The samples were then removed from the oven and left at room temperature for a period of three days, and then tested for bond shear strength utilizing an Instron tensile tester. The following Table III illustrates the formulations employed and the bond shear strength observed.

TABLE III

| Sample Number | (phr.) Dicyandiamide | (phr.) Coord. Complex | Bond Shear Strength (p.s.i.) |
|---|---|---|---|
| For Comparison: | | | |
| 10 | 10 | | 570 |
| The Invention: | | | |
| 11 | 10 | 2 | 628 |
| 12 | 10 | 5 | 1,034 |

It is apparent from the above data that there is a pronounced synergistic effect as regards acceleration of cure time when the mixtures of the present invention are employed, i.e., where from 10 to 25 parts of a mixture of dicyandiamide and coordination complex having a ratio of dicyandiamide to complex of from about 1:1 to 1:10, is admixed with the epoxy resin prior to curing.

It has further been found that the physical properties of such resins are not adversely affected, as compared to resin compositions absent the coordination complex accelerator, and that such resins may be advantageously employed in applications where a rapid high temperature latent cure is desired. Such resins are particularly suitable as adhesives, reinforced plastics, coatings, potting compounds, and the like. Further, it is to be understood that fillers and other conventionally employed materials may be utilized in the resins of the present invention for the desired purposes, and that such resins may be prepared, fabricated or applied by any desired or conventional technique.

What is claimed is:

1. A thermosettable resin mixture consisting essentially of 100 parts by weight of an epoxy resin having a plurality of 1,2-epoxide groups per molecule, and from about 10 to 25 parts by weight of a mixture consisting essentially of (a) dicyandiamide and (b) a polyamine-metallic salt coordination complex which is unstable at a temperature of from about 100° to 200° C., wherein said dicyandiamide is present in amounts sufficient to provide at least about 1 part by weight per 100 parts of said epoxy resin, wherein the ratio of dicyandiamide to polyamine-metallic salt coordination complex is from about 1:1 and 1:10; and wherein said metallic salt is selected from the group consisting of zinc and cadmium halides, oxalates and benzoates.

2. The composition of claim 1 wherein said polyamine-metallic salt coordination complex is a complex of a polyethyleneamine and said metallic salt.

3. The composition of claim 2 wherein said coordination complex is a complex of ethylenediamine and zinc oxalate.

4. The composition of claim 2 wherein said coordination complex is a complex of N-(β-phenethyl)-ethylenediamine and zinc oxalate.

5. A process for preparing an epoxy resin composition which can be cured rapidly to a thermoset resin which process consists of intimately admixing with an epoxy resin having a plurality of 1,2-epoxide groups per molecule a mixture consisting essentially of (a) dicyandiamide and (b) a polyamine-metallic salt coordination complex which is unstable at a temperature of from about 100° to 200° C., wherein said dicyandiamide is present in amounts sufficient to provide at least about 1 part by weight per 100 parts of said epoxy resin, wherein the ratio of dicyandiamide to a polyamine-metallic salt coordination complex is from about 1:1 and 1:10, and wherein said metallic salt is selected from the group consisting of zinc and cadmium halides, oxalates and benzoates.

6. The process of claim 5 wherein said polyamine-metallic salt coordination complex is a complex of a polyethyleneamine and said metallic salt.

7. The process of claim 6 wherein said coordination complex is a complex of ethylenediamine and zinc oxalate.

8. The process of claim 6 wherein said coordination complex is a complex of N-(β-phenethyl)-ethylenediamine and zinc oxalate.

References Cited

UNITED STATES PATENTS 2,962,453    11/1960    Phillips et al. _____ 260—2

WILLIAM H. SHORT, *Primary Examiner.*

T. E. PERTILLA, *Assistant Examiner.*